United States Patent Office 3,306,818
Patented Feb. 28, 1967

3,306,818
PRESERVATION OF SPERM
Karl Folkers, Menlo Park, and Atwood C. Page, Jr., Modesto, Calif., assignors to Merck & Co., Inc., Rahway, N.J., a corporation of New Jersey
No Drawing. Filed Sept. 4, 1963, Ser. No. 306,623
5 Claims. (Cl. 167—53.2)

This invention relates to keeping spermatozoa viable. More particularly, it is concerned with a method of keeping sperm motile in the presence of certain benzoquinone compounds and the chromanols and chromenols related thereto.

This is a continuation-in-part of our application Serial No. 148,839 filed October 31, 1961.

It is known that the maintenance and preservation of the biological activity of sperm cells are dependent upon the metabolic processes of the sperm. Various methods have been sought whereby the biological activity and motility of sperm might be extended. Thus, the preservation of the activity of sperm cells of poultry, such as chicken and turkey semen, has been a difficult problem for which no satisfactory solution has heretofore been found.

It is an object of the present invention to provide a means for preserving the motility of spermatozoa. Another object is to provide compositions suitable for the preservation of active sperm cells. Other objects will be apparent from the detailed description of our invention hereinafter provided.

In accordance with one embodiment of the present invention, it is now found that sperm cells remain motile for much longer periods in the presence of a small amount of 1,4-benzoquinone compounds (I and Is) having the structural formulas:

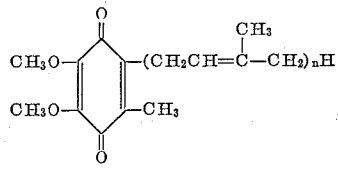

(I)

and

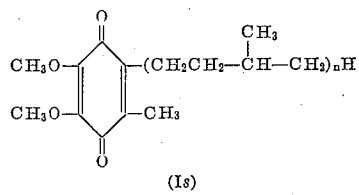

(Is)

wherein $n$ represents an integer from two or ten, or the chromanol (II) or chromenol (III) compounds represented by the structural formulas:

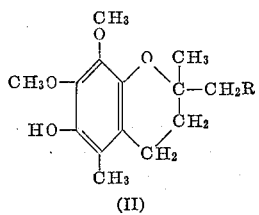

(II)

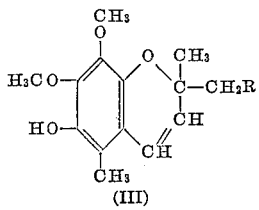

(III)

wherein R is a member from the group consisting of hydrogen, $$(CH_2-CH=\overset{CH_3}{\underset{|}{C}}-CH_2)_YH \text{ and } (CH_2-CH_2-\overset{CH_3}{\underset{|}{C}}HCH_2)_YH$$

where Y is an integer from one to nine.

Examples of these compounds, namely, members of the coenzyme Q group of compounds, which are useful in preserving the motility of sperm cells that might be mentioned include 2,3-dimethoxy - 5 - methyl-6-(3',7'-dimethylocta-2',6'-dienyl) - benzoquinone (coenzyme $Q_2$), 2,3 - dimethoxy - 5 - methyl - 6 - (3',7',11',15' - tetramethylhexadeca - 2',6',10',14' - tetraenyl) - benzoquinone (coenzyme $Q_4$), 2,3-dimethoxy-5-methyl-6-(3',7',11',15', 19',23' - hexamethyltetracosa - 2',6',10',14',18',22' - hexaenyl)-benzoquinone (coenzyme $Q_6$), 2,3-dimethoxy - 5-methyl - 6 - (3',7',11',15' - tetramethyl - 2' - hexadecenyl)-benzoquinone (hexahydrocoenzyme $Q_4$), and the corresponding chromenols and chromanols, namely, 2,5-dimethyl - 7,8 - dimethoxy - 2 - (4' - methyl - 3' - pentenyl)-6-chromenol or chromanol, 2,5-dimethyl-7,8-dimethoxy-2 - (4',8',12' - trimethyl - trideca - 3',7',11' - trienyl) - 6-chromenol or chromanol, 2,5-dimethyl-7,8-dimethoxy-2-(4',8',12',16',20' - pentamethylhenecosa - 3',7',11',15',19'-pentaenyl)-6-chromenal or chromanol, and 2,5-dimethyl-7,8 - dimethoxy - 2 - (4',8',12' - trimethyltridecyl) - 6-chromenol or chromanol.

In accordance with an embodiment of the present invention, it is found that spermatozoa remain motile for long periods in the presence of a minor amount of the above-described 1,4-benzoquinone compounds or the corresponding chromanol or chromenol compounds. Thus, the addition of a minor quantity of such substances to whole semen or to other media containing sperm cells isolated from semen is effective in maintaining the motility of the sperm cells. Alternatively, the substance can be added to vaginal preparations such as creams, jellies and the like which are then used in situ for maintaining the motility of the sperm cells.

The addition of the 1,4-benzoquinone compound, the chromanol or the chromenol can be accomplished in accordance with methods known in this art. Thus, it can be effected by adding a solution of the compound in a suitable organic solvent for the compound, for example, ethanol, diethyl ether, and the like; ethanol being preferred solvent since the 1,4-benzoquinones and their related chromanols and chromenols are moderately soluble in this solvent.

The solution of said compound in an organic solvent can be directly diluted by addition of principally aqueous media, or by the addition of such media to the organic solvent solution. Such steps may require gentle mixing by stirring, or more vigorous homogenization, such as application of colloid mills, high speed blendors, ultrasonic apparatus and the like, as ordinarily applied to the art of producing finely divided dispersions of compounds having relatively low solubility in substantially aqueous media. The organic solvent can be removed subsequently or concomitantly by means usual in the art, such as flash evaporation, lyophilization, distillation under vacuum and the like.

The preferred technique for the case of liquid, substantially aqueous media, comprises addition of ethyl alcohol solutions of the 1,4-benzoquinone compound or the chromanol or chromenol in this solvent to the diluent medium to be used. A number of such diluent mediums are known in the current art. In the case of chicken semen the media comprise inorganic salts, inorganic and organic buffering salts, energy sources such as fructose, and amino acid or protein sources such as sodium glutamate or whole egg albumen, all of which are familiar in the veterinary and animal husbandry art, and are commonly chosen to satisfy routine requirements of buffering, nutriment, viscosity, tenacity, compatability, reduction-oxidation potential balance and the like.

A preferred medium for dilution of chicken semen in the Wilcox buffer, comprising whole white of egg, fructose, sodium phosphate buffer, and antibiotics such as oxytetracycline and dihydrostreptomycin, all in water solution. Such medium is mixed gently with the whole semen to make diluted semen for storage, the preferred range ratios being 0.1 to 100 parts of medium with one part of whole semen.

In the technique for chicken semen, our invention is applied by mixing aliquots of such diluted semen with a solution of one of the subject compounds to produce a final diluted semen preparation containing from 1 to 100 micrograms per ml. of said compound. It is then observed that sperm motility persists after many days of storage; there being substantial motility present in treated samples, but essentially no motility in control samples made from the same semen and diluted and stored in a similar way.

Although we do not wish to be bound to the following theoretical discussion, a relationship of sperm motility to electron transport can be visualized as follows:

Movement of sperm cells is accomplished by contractile structures in the flagella, and the energy for this contraction is obtained by enzymatic cleavage of adonosine triphosphate (ATP).

ATP is known to be synthesized in animal cells by reactions which are coupled to hydrogen transport. In sperm cells the enzymes cleaving ATP and the enzyme dehydrogenating succinic acid occur together in association with the same micro-structures. Coenzyme Q is known in turn to be associated in animal cells with the reaction sequence called succinoxidase and the first reaction of which is the succinic acid dehydrogenating enzyme mentioned above.

The following examples are illustrative of the methods and compositions of the present invention.

*Example 1*

Approximately 0.020 ml. of an ethanol solution containing 4.5 mg. per ml. of 2,5-dimethyl-7,8-dimethoxy-2-(4',8',12'-trimethyltridecyl)-6-chromanol (the chromanol of hexahydrocoenzyme $Q_4$) was delivered into a test tube from a micropipette. Into another test tube a corresponding amount of pure ethanol was delivered.

To each of these tubes was added 1.50 ml. of a medium prepared as follows:

An egg was treated with 70% ethanol for 45 minutes to decontaminate the shell, was opened, and the egg white separated and transferred to a sterile Waring microblender, and homogenized for five seconds at high speed. Six ml. of this homogenized egg white, 4 ml. of a sterile isotonic solution of frustose (60 mg./ml.) in water, 50 ml. of sterile aqueous sodium phosphate buffer (5.16 g. $NaH_2PO_4 \cdot H_2O + 16.34$ g. $Na_2HPO_4$ per liter, adjusted to pH 7.2), 12 mg. of oxytetracycline hydrochloride and 60 mg. of dihydrostreptomycin sulfate were combined and mixed aseptically. This is called the basal medium.

The contents of each test tube was then mixed and a 0.25 ml. portion of the chromane containing mixture was transferred to a sterile test tube (10 x 75 mm.) Likewise an 0.25 ml. portion of the control mixture was added to a similar test tube.

To each of these tubes was then added 0.25 ml. of a mixture of fresh chicken semen and unsupplemented medium which was prepared as follows:

Semen was collected from roosters of proven fertility in accordance with procedures known in the veterinary art and immediately mixed with four volumes of the basal medium.

The 0.25 ml. aliquot of the diluted semen-medium mixture was transferred to the tube containing the mixture of the ethanolic solution of the chromanol and the medium, and to the control tube containing ethanol and medium. After being gently agitated to mix the contents, the tubes were stored in a refrigerator at 10° C. in darkness for seven days. Preliminary examination of similar unsupplemented control tubes revealed that at the end of this period the control samples contained essentially no motile sperm cells.

After the seven day storage period the motility of the sperm in the two tubes was read as follows:

Each tube of stored, diluted semen was removed from the refrigerator, placed for 3¾ min. in a 37° water bath, and mixed by being drawn into and expelled from a pipette three times. A droplet of the sperm suspension was placed on a cover slip and the latter inverted on a prewarmed (37° C.) well slide. The slide was placed into a thermostated (37° C.) microscope stage and examined at 400 diameters magnification for sperm cells and the percent of motile sperm cells was estimated independently by three skilled observers, and the estimate averaged.

These observations revealed that in the case of the control sample containing ethanol, none of the sperm cells were motile, whereas the sperm stored in the medium supplemented with 30 micrograms per ml. of 2,5-dimethyl-7,8-dimethoxy-2-(4',8',12' - trimethyltridecyl)-6-chromanol about 40% of the sperm cells were motile.

In another similar experiment in which one experimental tube was supplemented with 10 micrograms per ml. of 2,5-dimethyl - 2 - (4',8',12'-trimethyltridecyl)-6-chromenol about 34% of the sperm cells were found to be motile. None of the cells were motile in a corresponding control tube.

*Example 2*

Following the procedures described in Example 1, the motility of chicken sperm cells in a control tube was compared with a tube supplemented with 30 micrograms per ml. of 2,3-dimethoxy-5-methyl-6-(3',7'-dimethyloctadienyl)-benzoquinone (coenzyme $Q_2$). After the seven day storage period, it was found that none of the sperm cells were motile in the control whereas 65% of the sperm of the supplemented medium were motile.

*Example 3*

Similarly, by the procedure of Example 1, it was found that 63% of the chicken sperm cells stored for seven days in the presence of 30 micrograms per ml. of 2,3-dimethoxy-5-methyl-6-(3',7',11',15' - tetramethyl-2'-hexadecenyl)-benzoquinone (phytyl coenzyme Q) were motile, whereas no motility was observed in the control sample.

*Example 4*

Using the procedures described in Example 1, the motility of sperm cells in mediums supplemented with various amounts of 2,5-dimethyl-7,8-dimethoxy-2-(4',8',12'-trimethyltridecyl)-6-chromanol (the chromanol of hexahydrocoenzyme $Q_4$) was determined. The results of these experiments are shown in the following table:

| Concentration, micrograms/ml. | Percent motile sperm cells |
|---|---|
| 3 | 55 |
| 10 | 53 |
| 30 | 58 |

The 1,4-benzoquinone compounds referred to above such as coenzyme $Q_2$ (2,3-dimethoxy-5-methyl-6-geranyl-benzoquinone), hexahydrocoenzyme $Q_4$ (2,3-dimethoxy-5-methyl-6-phytyl-benzoquinone, coenzyme $Q_6$ (Ubiquinone 30), coenzyme $Q_8$, coenzyme $Q_{10}$, the chromanol of hexahydrocoenzyme $Q_4$, the chromenol of hexahydrocoenzyme $Q_4$, and the chromenol of coenzyme $Q_6$ can be prepared in accordance with procedures described in this art.

In general, the chromanols corresponding to coenzyme Q compounds can be prepared by the known procedure used to convert coenzyme $Q_{10}$ to the corresponding chromanol. Thus, this procedure can be carried out as follows: A solution of the coenzyme Q hydroquinone in acetic acid containing potassium hydrogen sulfate is refluxed for one hour. After concentration the residue is dissolved in Skellysolve B, washed with water, chromatographed over Florosil and the chromanol recovered by eluting the adsorbate with a mixture of ether and isooctane.

Similarly, the various coenzyme Q compounds can be converted to the corresponding chromenols by the procedure described in the art for the conversion of coenzyme $Q_{10}$ to the corresponding chromanol. Thus, this conversion can be effected as follows: The coenzyme Q compound is adsorbed on alkaline alumina from isooctane. After about three hours the material is eluted with a 1:1 mixture of methanol and ether. The eluate is concentrated under reduced pressure and the residue is purified by chromatography over silica gel to obtain the pure chromanol.

Various changes and modifications of this invention can be made and, to the extent that such variations incorporate the spirit of this invention, they are intended to be included within the scope of the appended claims.

What is claimed is:

1. A stabilized sperm preparation which comprises live motile sperm cells intimately dispersed in an aqueous medium including assimilable sources of carbon and nitrogen, inorganic salts essential to the cells and a minor amount of a compound from the group consisting of 1,4-benzoquinone compounds of the formula:

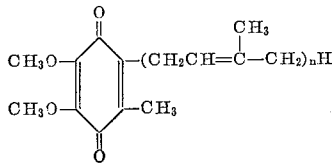

and

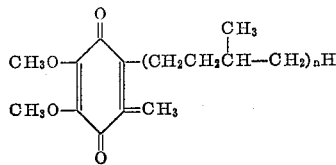

wherein $n$ is an integer from two to ten, and the chromanols and chromenols having the formulas

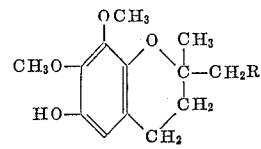

and

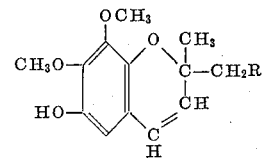

wherein R is a member from the group consisting of hydrogen,

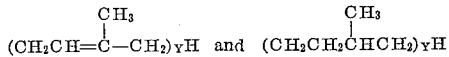

where Y is an integer from one to nine.

2. A stabilized sperm preparation of claim 1 wherein the compound is 2,5-dimethyl-7,8-dimethoxy-2-(4',8',12'-trimethyl-tridecyl)-6-chromenol.

3. A stabilized sperm preparation of claim 1 wherein the compound is 2,5-dimethyl-7,8-dimethoxy-2-(4',8',12'-trimethyl-tridecyl)-6-chromanol.

4. A stabilized sperm preparation of claim 1 wherein the compound is 2,3-dimethoxy-5-methyl-6-(3',7'-dimethyloctadienyl) benzoquinone.

5. A stabilized sperm preparation of claim 1 wherein the compound is 2,3-dimethoxy-5-methyl-6-(3',7',11',15'-tetramethyl-2'-hexadecenyl) benzoquinone.

No references cited.

SAM ROSEN, *Primary Examiner.*